United States Patent [19]

Azizi et al.

[11] Patent Number: 5,525,967
[45] Date of Patent: Jun. 11, 1996

[54] SYSTEM AND METHOD FOR TRACKING AND LOCATING AN OBJECT

[76] Inventors: S. Massoud Azizi, 19636 Crystal Ridge La., Northridge, Calif. 91326; S. Masih Azizi, 7141 Scenic Cir., Anaheim Hills, Calif. 92807

[21] Appl. No.: 143,630

[22] Filed: Nov. 1, 1993

[51] Int. Cl.$^6$ ................................................ G08B 23/00
[52] U.S. Cl. ..................... 340/573; 340/539; 343/898; 455/277.1
[58] Field of Search ....................... 340/571–573, 340/505, 539; 455/88–90, 100, 277.1; 343/702, 718, 894, 898–99; 348/143, 152, 155, 158

[56] References Cited

U.S. PATENT DOCUMENTS

| | | | |
|---|---|---|---|
| 4,868,544 | 9/1989 | Havens | 340/573 X |
| 5,274,359 | 12/1993 | Adams | 340/573 X |
| 5,298,883 | 3/1994 | Pilney et al. | 340/573 |

Primary Examiner—Thomas Mullen
Attorney, Agent, or Firm—Rapkin, Gitlin & Moser

[57] ABSTRACT

A system and method to monitor the specific location of a person, pet or item of personal property by employing elements that enable the user to pinpoint both the distance and the direction of the person or object being monitored relative to the position of the monitoring or transmission unit (the "source"), comprising a tracking transceiver unit, which tracks and monitors the person or object, and the target transceiver unit, which is worn or affixed to the person or object being monitored. The tracking transceiver unit broadcasts a signal to a target transceiver unit, which, upon receiving the signal, will then broadcast a response signal back to the tracking transceiver unit. The tracking transceiver unit's antenna, which comprises a plurality of flat sensor plate-like elements formed together in a generally spherical configuration, picks up the signal and then conveys the information it receives to a special response signal processor unit, which analyzes the data to determine the direction of the person or object being monitored. Information filtered and analyzed through the response signal processor unit is then conveyed to a central processor unit, which uses the data to calculate the distance of the person or object being monitored from the source.

6 Claims, 2 Drawing Sheets

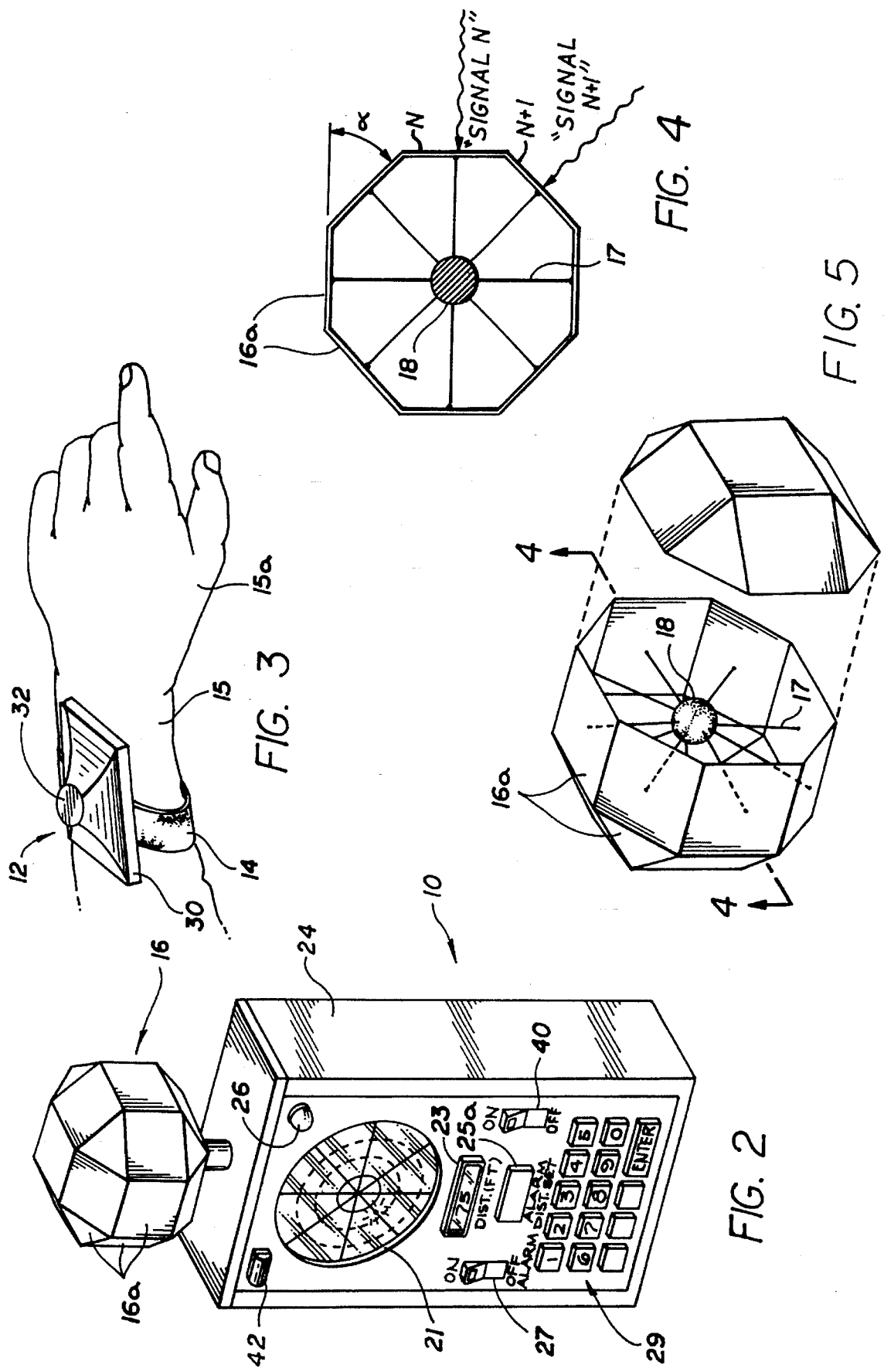

SYSTEM AND METHOD FOR TRACKING AND LOCATING AN OBJECT

FIELD OF THE INVENTION

This invention is directed generally to a system and method for tracking and locating objects, and more particularly to a system and method for electronically determining the distance and direction of an object from a specified tracking source.

BACKGROUND OF THE INVENTION

The use of systems and methods to monitor the movements and locations of a variety of objects, including individuals, pets or even items of personal property, is well known. Every year, thousands of infants and young children are lost or abducted, particularly in venues such as shopping malls and amusement parks. As any law enforcement official will confirm, the first few minutes after the child is determined to be missing are the most critical in locating the child. Pets and even items of personal property are also lost or stolen on a regular basis. Here again, the initial moments after the discovery of the loss or theft of the pet or object are the most critical in any successful effort to locate them. In the past, telemetry and radar have been used to effectively track and locate objects, both on the ground, in the water and in outer space. This type of tracking utilizes the emission of a signal from a source and the reflection of the same signal received at the source from the target being tracked. Other means of tracking objects are also known. For example, the transmitter of U.S. Pat. No. 5,119,072 includes an antenna that radiates a frequency modulated rf carrier signal to a receiver. The receiver contains circuitry for monitoring field strength of the carrier signal and for indicating range from the receiver to the transmitter as a function of such field strength. Another example is U.S. Pat. No. 5,021,794, which discloses a locator system comprising a radio transmitter concealed on the person to be located which activates and transmits a coded UHF radio homing signal upon the receipt of an initiating signal containing the person's specific code. Tracking vehicles with automatic UHF radio direction finding and distance measuring equipment are used for locating the source of the homing signal. Other examples are U.S. Pat. No. 4,990,892, which discloses a personnel locator system using infrared transmitters and receivers to monitor classes of individuals; U.S. Pat. No. 4,868,544, which discloses a shopping cart retrieval system comprising a VHF beacon radio transmitter that continuously emits a signal and a VHF receiver with an omnidirectional and directional antenna; and, U.S. Pat. No. 4,899,135, which discloses a child monitoring device that includes two or more transceivers operating in the radio or ultra sonic frequency ranges.

Monitoring systems and methods of the types generally referred to hereinabove may include a transmitter or monitoring unit, and a portable receiver removably attached to the person or object being monitored to receive a signal broadcast by the transmitter. The most common of these systems or methods employs technology that is capable only of determining the precise distance the person or object is from the transmitter or monitoring unit, and possibly may include means to alert the transmitter, by sounding an alarm, when the person or object exceeds a predetermined distance from the monitoring unit. The large majority of these systems include no capability for determining the direction of the person or object being monitored, and in these few instances where this capability exists, it does so at a tremendously high price due, in large part, to the involvement of complex technology and equally high manufacturing costs. In contrast to the prior art systems and methods, the present invention employs technology that combines the capability of determining accurately both the distance and the direction of an individual or object being monitored relative to the transmission or monitoring point, and achieves this at a relatively low cost of manufacturing.

SUMMARY OF THE INVENTION

The present invention provides a solution to the foregoing problems not addressed in the prior art. The present invention provides a system and method to monitor the specific location of a person, pet or item of personal property (the "person or object") by employing elements that enable the user to pinpoint both the distance and the direction of the person or object being monitored relative to the position of the monitoring or transmission unit (the "source"). The system includes, at minimum, two components, namely a tracking transceiver unit, which is the unit responsible for tracking and monitoring the person or object, and the target transceiver unit, which is worn or affixed in some fashion to the person or object being monitored. Using pulsating low frequency sound waves or radio waves, the tracking transceiver unit broadcasts a signal to a target transceiver unit, which is set to the exact frequency of the signal it expects to receive. Upon receiving the signal, the target transceiver unit will broadcast a response signal back to the tracking transceiver unit. There, the tracking transceiver unit's antenna, which comprises a plurality of flat sensor plate-like elements formed together in a generally spherical configuration, picks up the signal and then conveys the information it receives to a special response signal processor unit, which analyzes the data to determine the direction of the person or object being monitored. The memory in the response signal processor unit is programmed with information specific to each of the antenna's sensor plates, including the signal frequencies associated with each plate given a variety of expected target positions. Thus, the response signal's processor unit receives information about the signals striking the various sensor plates, identifies the strongest signal, which is most near or coincidental with the angle of incidence of one particular sensor plate only, and then compares the data to the information in the memory to identify that plate and, thus, determine the direction of the person or object being monitored. Information filtered and analyzed through the response signal processor unit is then conveyed to a central processor unit, which uses the data to calculate the distance of the person or object being monitored from the source. The precise location, including both the distance and the direction, of the target is then displayed on a screen incorporated into the housing of the tracking transceiver unit.

Accordingly, it is an object of the present invention to provide a novel tracking and locating system and method for locating a person or an object being monitored.

It is a further object of the present invention to provide a novel tracking and locating system and method that has the unique capabilities to determine both the precise distance and the direction of the person or object being monitored.

It is yet a further object of the present invention to provide a novel tracking and locating system and method which overcomes the disadvantages associated with prior art systems and methods employed to monitor and track a person or objects.

It is yet still a further object of the present invention to provide a tracking and locating system and method that employs portable transceivers to emit and respond to tracking signals.

It is yet still a further object of the present invention to provide a tracking and locating system and method that is simple and easy to use and relatively inexpensive to manufacture.

Other objects and advantages of the present invention will become apparent in the following specifications when considered in light of the attached drawings wherein the preferred embodiment of the invention is illustrated.

BRIEF DESCRIPTION OF THE DRAWINGS

FIG. 2 illustrates in perspective the tracking transceiver unit in accordance with the present invention.

FIG. 3 illustrates in perspective the target transceiver unit strapped to a child's wrist in accordance with the present invention.

FIG. 4 is a cross-section of the tracking transceiver unit antenna taken along lines 4—4 of FIG. 5 in accordance with the present invention.

FIG. 5 is an enlarged, sectional view of the tracking transceiver unit antenna with a portion broken way in accordance with the present invention.

DESCRIPTION OF THE PREFERRED EMBODIMENT

Figure 1:
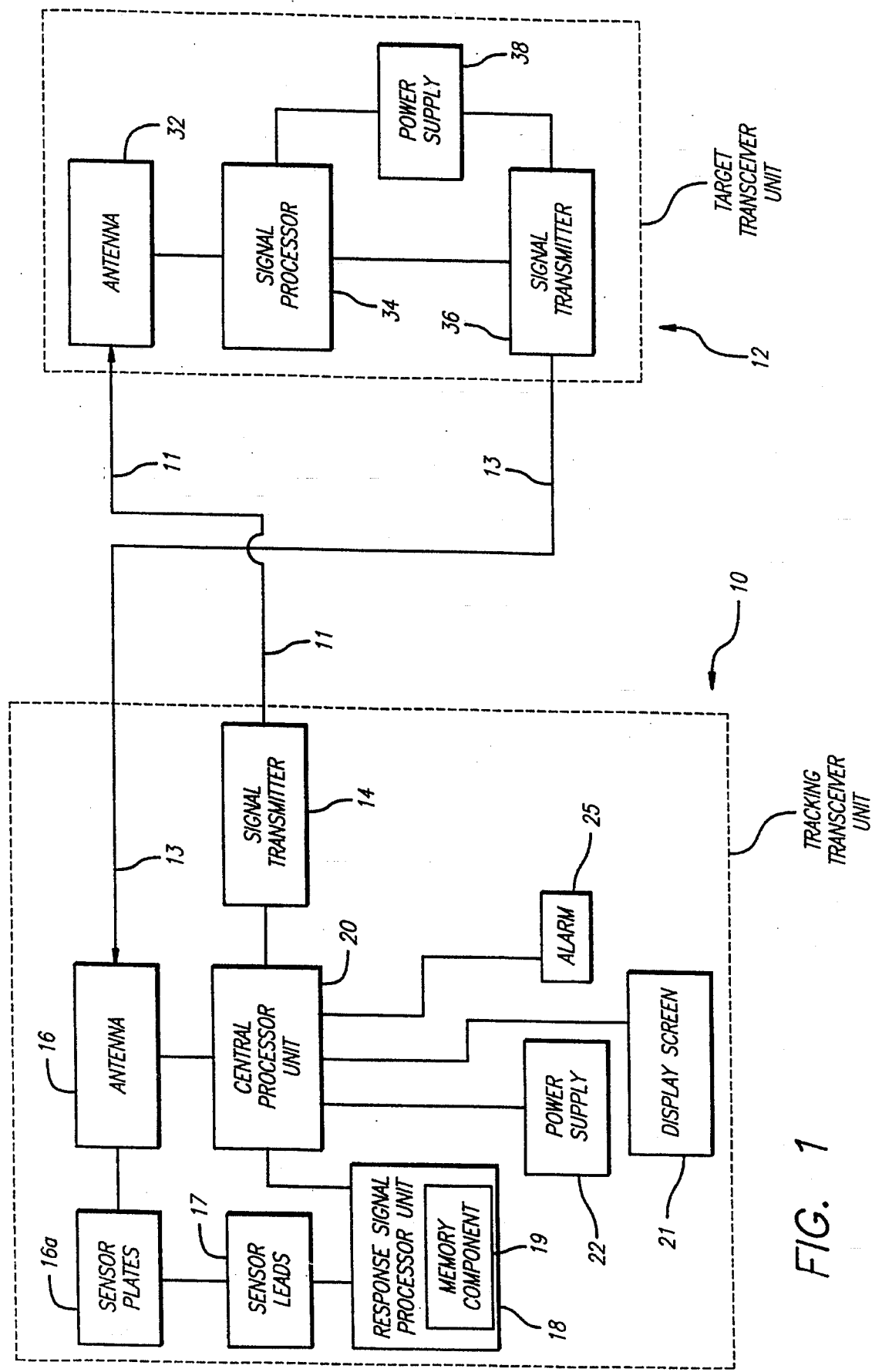
FIG. 1 is a functional block diagram of the system and method for tracking and locating an object in accordance with the present invention.

Referring now to the block diagram of FIG. 1, there is illustrated, in block form, the various elements of the tracking and locating system and method of the present invention, which is designed to locate and identify the distance and the direction of the person or object being monitored relative to a particular source. The system includes a portable tracking transceiver unit 10 or "source," as it will also be known, and a target transceiver unit 12, which is worn or attached in some appropriate manner to the person or object being monitored or tracked. An example of a means of securing the target transceiver unit 12 to the person or object being monitored is a strap 14 adapted to be removably affixed to the person or object by encircling the person or object or some portion thereof, such as the wrist 15 of a person's hand 15a. In the preferred embodiment of the invention, the system includes a single portable target transceiver unit 12, though the system is capable of including several target transceiver units 12 with electronic circuitry that would be set to the same frequencies as one or more of the companion tracking transceiver units 10, as the user desires.

Each tracking transceiver unit 10 includes a transmitter unit 14, a response signal receiving antenna 16, a response signal processor unit 18, a central processor unit 20, a data display screen 21, a power supply unit 22, an on-off switch 40 and an on-off indicator light 42 all enclosed within or adjoining a housing 24. Also integrated with each tracking transceiver unit 10 are an alarm unit 25, which is electrically connected to an alarm light 26, and an alarm on-off switch 27. Response signal receiving antenna 16, usually the size of a golf ball or smaller, comprises a plurality of adjoining generally flat sensor plates 16a formed together in a generally spherical configuration. Each of the sensor plates 16a has an outwardly facing spatial orientation that is different from the outwardly facing spatial orientation of each of the other said plates 16a.

Each target transceiver unit 12 includes a housing 30 enclosing a tracking signal antenna 32, a tracking signal processor unit 34, a response signal transmitter unit 36 and a power supply unit 38.

The power supply units 22 and 38 usually consist of conventional batteries of the chargeable or non-chargeable type. The means used in each tracking transceiver unit 10 and target transceiver unit 12 for transmitting and receiving signals comprise printed circuit boards incorporating commercially available integrated circuits in the form of micro chips (not shown).

The configuration of the tracking transceiver unit 10 is normally rectangular, though it could be designed more square or oval in shape, if desired. The size of the tracking transceiver unit 10 is typically the same or similar to that of an average size portable calculator or as large as a typical walkie-talkie or relatively small portable cellular telephone. The configuration of the target transceiver unit 12, in its preferred embodiment, is as it appears in FIG. 3. As with the shape of the tracking transceiver unit 10, the configuration of the target transceiver unit 12 may vary. By design and out of necessity, since the unit usually will be carried by small children and possibly pets, the size of the target transceiver unit 12 will be considerably smaller than that of the tracking transceiver unit 10.

The tracking transceiver unit 10 is capable of generating a train of pulsating signals 11 comprising a series of low frequency sound waves or radio waves in all directions. The command for the transmitter unit 14 inside the tracking transceiver unit 10 to transmit these periodic signals 11 is given by the central processor unit 20 in predetermined time intervals, e.g. at intervals of one (1) second or more. The signals 11 transmitted by the tracking transceiver unit 10 are frequency unique to a specific target transceiver unit, which has the capability of recognizing the frequency of that particular signal and distinguishing it from the signals generated from other unrelated sources. Thus, signals generated from garage door openers, alarm remotes, cellular telephones and the like will not interfere with the effective operation of the system or method of the present invention.

The target transceiver unit 12 recognizes the signals 11 generated by the tracking transceiver unit 10 and then transmits different signals of its own, called the response signals 13. The response signals 13, which are actually comprised of a series of continuously emitted parallel sound or radio waves, are received by the tracking transceiver unit 10 enabling that unit to then identify the distance and the direction of the target object from the position of the tracking transceiver unit 10. This is achieved by analyzing the data received when the response signals 13 impact upon the various sensor plates 16a. The sensor plates 16a are designed to detect the response signals 13 that may be coming at them from any direction. Each sensor plate 16a is attached to a sensor lead 17, which itself is electrically joined to the response signal processor unit 18. The sensor plates 16a are specifically designed to sense the response signal(s) being generated by the target transceiver unit 12. Sensor plates 16a are able to recognize the magnitude of the response signals 13 based on the angle of incidence of a particular plate 16a. For example, an individual response signal 13 impacting at a 90 degree angle relative to the plane of one particular sensor plate 16a, i.e. impacting at a vertical or horizontal direction normal to the surface of the plate, corresponds to a preset response signal frequency already programmed into its memory component 19. The number of sensor plates 16a are proportional with the directional sensitivity of the system. The greater the number of sensor plates 16a, the better able the system will be to achieve its objective of accurately pinpointing the direction and distance of the target to the source. If, for example, "N" as shown in FIG. 4, corresponds to one or more sensor plates 16a, then N+1, N+2, etc. would correspond to an increase in that number. The angle alpha, also as shown in FIG. 4, decreases in size as "N" increases. The greater "N" is, and the greater the corresponding decrease in the size of angle alpha, the easier it will be to determine the direction of the target object more accurately.

When a response signals 13 are sent by the target transceiver unit 12, the sensor plates 16a facing the general direction of the source of the response signals 13 will relay the signal frequencies to the response signal processor unit 18. The response signal processor unit 18 includes information in its memory component 19 about each of the sensor plates 16a, including the signal frequencies associated with each plate given a variety of predetermined target positions. Thus, for example, a target sending a response signal that impacts a plate "N" at an angle alpha of 60 degrees corresponds to a frequency of 15 Hz. A signal impacting that same or some other plate nearby might result in a frequency of, for example, 25 Hz. Since there is only one highest magnitude of frequency impacting the sensor plates from any one source, the comparison of that information with the information in the memory component 19 of the response signal processor unit 18 will indicate the direction of the person or object that the system is tracking. In other words, the response signal processor unit 18 will read the information conveyed to it by the sensor plates 16a through the sensor lead 17, analyze that information and then determine which plate's data is closest to the preset response signal frequency already programmed into its memory component 19. Information about the specific plate identified ("incident plate"), which indicates the direction of the person or object being tracked, along with the information about the time the individual response signal 13 impacted upon the sensor plate(s) 16a ("time incidence") is then sent to the central processor unit 20, which interfaces with the other components integrated within the tracking transceiver unit 10. The central processor unit 20 also keeps track of the time the tracking signal 11 was sent to find the target transceiver unit 12. With this information, together with the information about the time of incidence, the central processor unit 20 is then able to calculate the distance between the target object and the tracking transceiver unit 10. This distance is determined by taking the elapsed time, i.e. the total time it takes for a single tracking signal 11 to travel to the target transceiver unit 12 and a single response signal 13 to travel back to the response signal receiving antenna 16, less the preset amounts of time the target transceiver unit 10 and the response signal processor unit 18 will each require to process the signal information.

The mathematical formula for determining this distance is the following:

$$D = \frac{(T - T_1 - T_3 - T_5) V}{2}$$

Where

T=total elapsed time from the initiation of the command to the reception of the response signal by the central processor unit $T_1$=the time elapsed from the moment the signal transmission command is initiated until the signal transmission commences from the source $T_2$=signal elapsed time of travel between the source and the target transceiver $T_3$=target transceiver signal processing time $T_4$=signal elapsed time of travel between the target transceiver and the source $T_5$=source signal processing time V=signal velocity per unit time Having identified the incident plate, and, thus, the direction of the target object, this information is then translated into a preprogrammed two dimensional coordination. This, together with the information about the target object's distance from the source, is then sent to the liquid crystal data display screen 21 where it is illustrated employing dots and lines on an X-Y coordinate 360 degree location grid. The screen 21 is preferably round, though it may also be oval, square or rectangular in shape. The tracking transceiver unit 10 may also provide a second display screen 23 for indicating, by the use of appropriate number references, the actual distance, in feet for example, of the target object from the source. As with the data displayed on the screen 21, the central processor unit 20 will also interface with the screen 23 and send the calculated distance information to the screen 23 to be displayed in the appropriate form.

The alarm unit 25 is interfaced with the central processor unit 20 which, with the information known about the distance and direction of the target object, can convey a signal to the alarm unit 25 if the target object exceeds a predetermined distance from the tracking transceiver unit 10. In this event, the central processor unit 20 will command the alarm unit 25 to sound an audible and/or visual alarm signal such as, for example, the flashing alarm light 26. The predetermined alarm distance perimeter, which is set by depressing the alarm distance set button 25a, may be illustrated on the display screen 21 as well. An alarm on-off switch 27 is also provided to activate and de-activate the alarm mode. A key pad 29 is provided to set alarm distance parameters.

The system and method of the present invention can utilize, at any one time, multiple tracking and target transceiver units so long as the units are properly matched and calibrated to corresponding frequencies, a task normally performed by the manufacturer before the components are sold. A single tracking unit may also be coupled with one or more target units provided the frequencies are properly matched and calibrated.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

We claim:

1. A system for monitoring and determining the location of an individual, pet, or item of personal property, comprising:

a tracking transceiver unit adapted for broadcasting a first signal;

a target transceiver unit adapted for receiving said first signal being broadcast by said tracking transceiver unit and broadcasting a second signal to said tracking transceiver unit, said target transceiver unit having means for securing said target transceiver unit to the individual, pet or item of personal property to be monitored;

an antenna means connected to said tracking transceiver unit for omnidirectional and directional reception of the second signal being broadcast by said target transceiver unit, said antenna means comprising a plurality of adjoining generally flat sensor plates formed together in a generally spherical configuration, each of said plates having an outwardly facing spatial orientation that is different from the outwardly facing spatial orientation of each of the other of said plates;

a response signal processor means having a memory component therein, said response signal processor means connected to the antenna means for receiving said second signal and comparing said second signal with a predetermined identifier programmed within said memory component, said predetermined identifier including a plurality of individual signal frequencies associated with each of said sensor plates such that for a given sensor plate, each of said individual signal frequencies is associated with a different predetermined direction relative to the orientation of said sensor plate wherein a second signal impacting said sensor plate at an angle of incidence normal to said plate produces the highest individual signal frequency corresponding to said plate thereby indicating the direction of the target transceiver unit from the tracking transceiver unit;

a central processor means for correlating information processed through said response signal processor means, said information comprising said second signal, the identity of several said sensor plates upon which said second signal impacts and several said angles of incidence formed by said second signal and several said sensor plates at the points of impact, and analyzing said information to provide an indication of the distance and direction of said target transceiver unit from the position of said tracking transceiver unit wherein the determination of the distance is calculated by dividing by two the total elapsed time it takes said first signal to travel from said tracking transceiver unit to said target transceiver unit and the corresponding said second signal to travel from said target transceiver unit to said tracking transceiver unit less the time required to process said first and second signals through said target transceiver unit and said tracking transceiver unit; and a viewing means operably connected to said central processor means for displaying data indicating the distance and direction of said target transceiver unit from the position of said tracking transceiver unit.

2. The system as in claim 1 wherein said means for securing said target transceiver unit comprises a strap for carrying said target transceiver unit adapted to be removably affixed to the individual, pet or item of personal property by encircling a part of the individual, pet or item of personal property.

3. The system as in claim 1 wherein said tracking transceiver unit is portable.

4. The system as in claim 1 wherein said target transceiver unit is portable.

5. The system as in claim 1 wherein said tracking transceiver unit includes circuitry means for activating an alarm signal when said target transceiver unit exceeds a predetermined distance from the position of said tracking transceiver unit.

6. A method of electronically monitoring the location of an individual, pet or item of personal property, comprising the steps of:

broadcasting a first signal from a tracking transceiver unit to a portable target transceiver unit positioned in an area containing said individual, pet or item of personal property to be monitored, said portable target transceiver unit being secured to said individual, pet or item of personal property to be monitored;

producing a second signal in said target transceiver unit in response to said first signal broadcast by said tracking transceiver unit and broadcasting said second signal to said tracking transceiver unit;

detecting said second signal by said tracking transceiver unit through an antenna comprising a plurality of adjoining generally flat sensor plates formed together in a generally spherical configuration;

receiving said second signal from said antenna into a response signal processor means to identify a single said sensor plate from among said plurality of adjoining flat sensor plates according to the strength of said second signal and relaying the identity of said sensor plate so identified from among said plurality of adjoining flat sensor plates to a central processor unit for analysis to determine the distance and direction of the individual, pet or item of personal property being monitored from the position of said tracking transceiver unit; and displaying information about said distance and direction of the individual, pet or item of personal property being monitored on a viewing screen.

* * * * *